United States Patent [19]

Arai et al.

[11] Patent Number: 5,549,952
[45] Date of Patent: Aug. 27, 1996

[54] OPTICAL INFORMATION MEDIUM AND METHOD FOR PRINTING ON THE SURFACE OF THE MEDIUM

[75] Inventors: Yuji Arai; Takashi Ishiguro; Toshio Watanabe, all of Tokyo, Japan

[73] Assignees: Sony Corporation; Taiyo Yuden Co., Ltd., both of Tokyo, Japan

[21] Appl. No.: 76,339

[22] Filed: Jun. 11, 1993

[30] Foreign Application Priority Data

Jun. 13, 1992 [JP] Japan .................................. 4-178967

[51] Int. Cl.⁶ ...................................................... B32B 3/02
[52] U.S. Cl. ...................... 428/64.4; 428/457; 428/500; 428/913; 346/135.1; 369/288; 430/270.11
[58] Field of Search ............................... 428/64, 65, 457, 428/913, 500; 430/945; 346/762, 135.1; 369/288

[56] References Cited

U.S. PATENT DOCUMENTS

| | | | |
|---|---|---|---|
| 4,903,255 | 2/1990 | Sugaya et al. | 369/284 |
| 4,957,776 | 9/1990 | Higuchi et al. | 427/54.1 |
| 4,961,077 | 10/1990 | Wilson et al. | 346/1.1 |
| 5,079,845 | 1/1992 | Childers | 33/363 K |
| 5,154,284 | 10/1992 | Starkey | 206/311 |
| 5,233,597 | 8/1993 | Nakayama et al. | 369/275.1 |
| 5,283,094 | 2/1994 | Sasakawa et al. | 428/64 |

FOREIGN PATENT DOCUMENTS

| | | |
|---|---|---|
| 4-122672 | 4/1992 | Japan . |
| 4-147887 | 5/1992 | Japan . |
| 5-7795 | 1/1993 | Japan . |

*Primary Examiner*—Patrick J. Ryan
*Assistant Examiner*—William A. Krynski
*Attorney, Agent, or Firm*—Flynn, Thiel, Boutell & Tanis, P.C.

[57] ABSTRACT

An optical information medium comprises an optically transparent substrate and a protective layer formed on the substrate for protecting a record portion so that information which is optically readable by means of a laser beam can be recorded. A hydrophilic film is formed at a side opposite to a side through which reproduction light of the optically transparent substrate is passed. The film has a hydrophilic surface on which an aqueous printing ink is fixable. Printing is possible on the hydrophilic surface by use of an ink jet printer. A method for printing on the hydrophilic surface is also described.

7 Claims, 2 Drawing Sheets

OPTICAL INFORMATION MEDIUM AND METHOD FOR PRINTING ON THE SURFACE OF THE MEDIUM

BACKGROUND OF THE INVENTION

1. Field of the Invention

This invention relates to an optical information medium on which it is possible to print, by use of a printing ink, on a side thereof which is opposite to a side through which reproduction light is passed.

2. Description of the Prior Art

In fields such as audio and information processings, an optical information medium called a compact disk (hereinafter referred to simply as CD) has now been in wide use. The CD has such a structure which has a substrate in the form of a doughnut-shaped disk made, for example, of polycarbonates, and a reflective layer of gold or aluminium vacuum deposited on the substrate. A protective layer, such as of a UV-cured resin, is formed on the reflective layer. Information data are encoded by forming projected and recessed pits on or in the surface of the substrate according to a spiral arrangement. Simultaneously with the formation of the substrate, these pits have been formed using molds such as stampers. The reflective layer is then formed on the pits-bearing substrate. When fabricated, the CD has already had the data encoded therein and can be thus used as a read-only optical information medium.

Usual practice is that the CD has an index indicating a recorded content and a variety of designs printed on the surface of the protective layer by a UV-curable or oil ink. These prints have been usually made by a printing means or procedure using transfer from a printing plate, such as screen printing, tampon printing or offset printing. These printing procedures are ones which are particularly suitable for so-called mass printing wherein the same pattern is a printed in great number at one time.

On the other hand, musical performances by amateur players have recently become popular. As a wide variety of amateur players are being taken part in such performances, it has become full of activities that amateur players individually make a relatively small number of CDs of their own work. These CD articles are created for the purposes, for example, of promotion, audition, test and setting up on their own expenses. Especially, because write-once optical information mediums which are so-called CD-WO and in which information can be written once by use of a laser beam and can be reproduced with use of a CD player have now been developed, such a self-made CD can be made more readily. Alternatively, in the field of computers, so-called CD-ROMs have become popular. As the write-once optical information medium has spread, users have now started to set up CD-ROM using CD-WO.

The protective layer of the optical information medium such as the thus self-made CD has no statement thereon, or has general letters or patterns alone printed thereon by means of a UV-curable ink or oil ink. It is thus necessary to indicate the index of a record content and, if necessary, other designs, on the surface of the protective layer or the printed surface of a label prior to or after recording of private information on the optical information medium.

However, the afore-mentioned printing procedure or means is used to print during the course of the fabrication process of the medium after formation of the protective layer. Since both protective layer surface and print surface are hydrophobic in nature, excessive equipment becomes necessary in order to print the protective layer on the surface thereof after recording of the private information. This eventually makes it difficult to arbitrarily print personal and optionally desired information. Accordingly, it is usual to write on the surface of the protective layer by use of an oily felt tipped pen or to attach a label on the surface. However, this requires hand-writing one at a time, thus being troublesome. In addition, the written patterns or their quality will not be made uniform and have a bad appearance, thus presenting the problem that the self-made optical information medium does not have a good appearance as a whole. Especially, where a label is attached, the surface is raised by the thickness of the attached label, leading to the problem that the optical information medium will undesirably undergo eccentric revolutions or surface fluctuation when reproduced and followed up.

SUMMARY OF THE INVENTION

A first object of the invention is to provide an optical information medium wherein given letters or patterns can be readily and satisfactorily formed on the surface of a protective layer of the medium.

A second object of the invention is to provide a method for printing a relatively smaller number of optical information medium with given letters and patterns on the surface thereof readily and substantially at a certain quality.

The optical information medium according to the invention is of the type which comprises a plate-shaped, optically transparent substrate and a protective layer which is formed directly or through other layers on the substrate and made of a resin and wherein optically readable information can be reproduced and/or recorded, characterized in that the optical information medium has a printing ink-fixable, hydrophilic surface at a side which is opposite to a side through which reproduction light of the optically transparent substrate is incident.

The method for printing on the surface of an optical information medium according to the invention is characterized by jetting an aqueous ink toward the hydrophilic surface to deposit the ink on the surface in an imagewise pattern, and fixing the deposited ink. The printing is preferably effected by use of an ink jet printer.

Since the optical information medium of the invention has the printing ink-fixable, hydrophilic surface at the side opposite to the side through which reproduction light is passed, desired letters or patterns can be drawn by any writing means such as writing utensils using aqueous or oil inks. As a matter of course, other means such as UV-curable inks may be used.

The medium which has such indications obtained after fixing of an aqueous ink on the hydrophilic surface becomes more flattened on the surface thereof than one having an indication by attachment of a label or the like. Thus, the medium is prevented from eccentric revolutions or surface fluctuation at the time when reproduced or followed up.

According to the surface printing method of the invention wherein an aqueous ink is jetted toward the hydrophilic surface and deposited and fixed on the surface, desired indications can be given to the surface of the medium without impeding the protective layer and the substrate. In addition, the medium has a flat surface, thereby preventing occurrence of eccentric revolutions and surface fluctuation on reproduction and following-up.

Especially, according to the printing method wherein an ink is jetted using an ink jet printer, when letters or patterns which are to be printed have been preliminarily created by means of personal computers, for example, these may be repeatedly used for the printing. Thus, indications wherein the printing patterns or quality is less scattered can be readily established.

PREFERRED EMBODIMENTS OF THE INVENTION

Reference is now made to embodiments of the invention.

Figure 1:
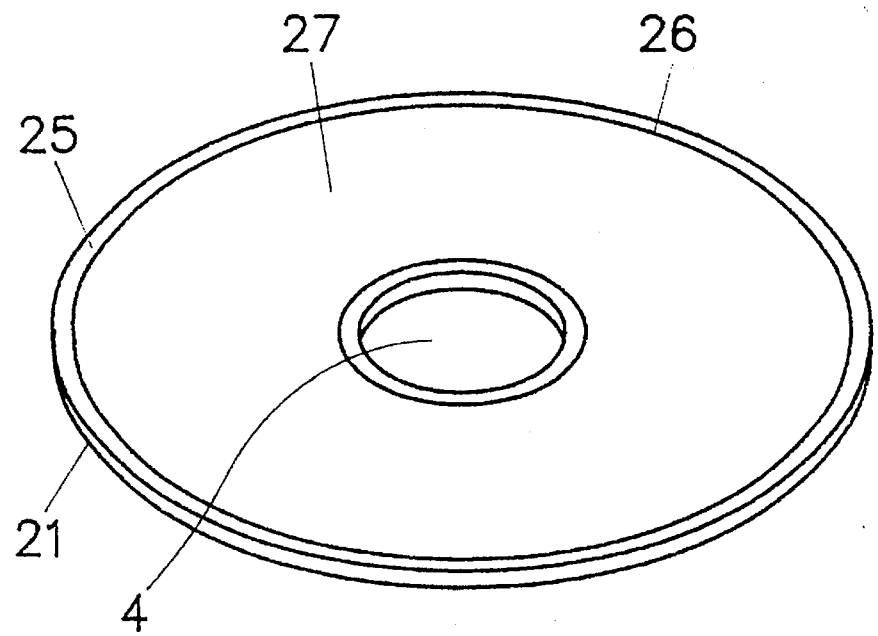
FIG. 1 is a perspective view of an outer appearance of an optical information medium.

FIG. 1 shows an optical information medium as viewed from a side opposite to a side through which reproduction light is incident. Accordingly, an optically transparent substrate 21 is at a lower side as viewed in the figure. As shown in the figure, a UV-cured resin layer 25 has a hydrophilic resin film 26 on the surface thereof. A clamp hole 4 is provided at the center of the medium. When the medium is set in position of a CD player, it is clamped by means of a clamper of a spindle.

Figure 2:
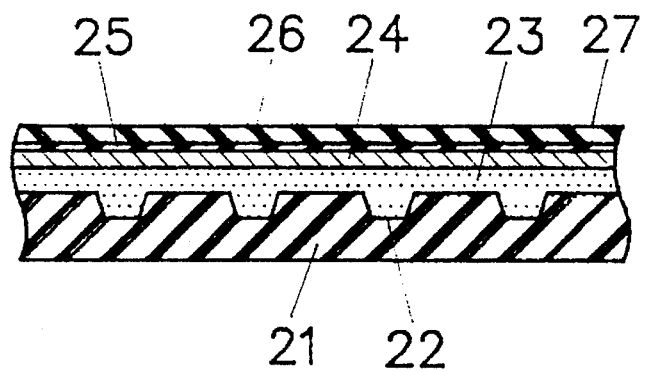
FIG. 2 is a schematic longitudinal sectional view of an essential part of an optical information medium according to one embodiment of the invention.

FIG. 2 shows the schematic section of a so-called write-once optical information medium provided as an example of the medium set out above. The transparent substrate 21 made, for example, of a polycarbonate resin has a spiral tracking guide groove 22 on one side thereof, on which a dye recording layer 23 is coated. A reflective layer 24 made of a metallic film such as gold, silver, aluminium or the like is formed on the dye recording layer, on which a protective layer 25 is formed. Moreover, a hydrophilic resin layer 26 having a hydrophilic surface 27 is formed on the protective layer 25.

Figure 3:
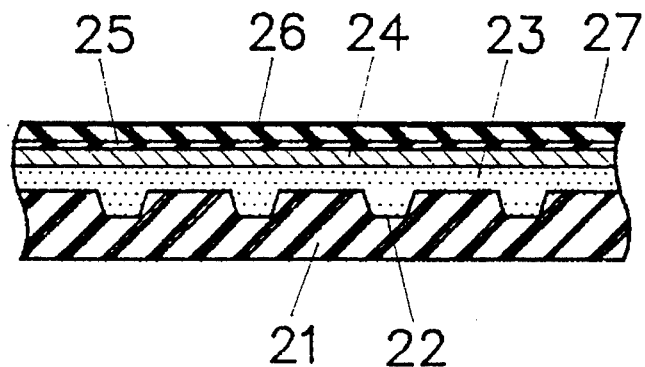
FIG. 3 is a schematic longitudinal sectional view of an essential part of an optical information medium according to another embodiment of the invention.

FIG. 3 schematically shows a section of a so-called write-once optical information medium as another embodiment of the medium of the invention. As in FIG. 2, the transparent substrate 21 formed with the guide groove on the surface thereof is formed thereon with the dye recording layer 23, reflective layer 24, protective layer 25 and hydrophilic resin film 26. In this embodiment, the hydrophilic resin film 26 has the hydrophilic surface 27 which is modified as will be described hereinafter.

Figure 4:
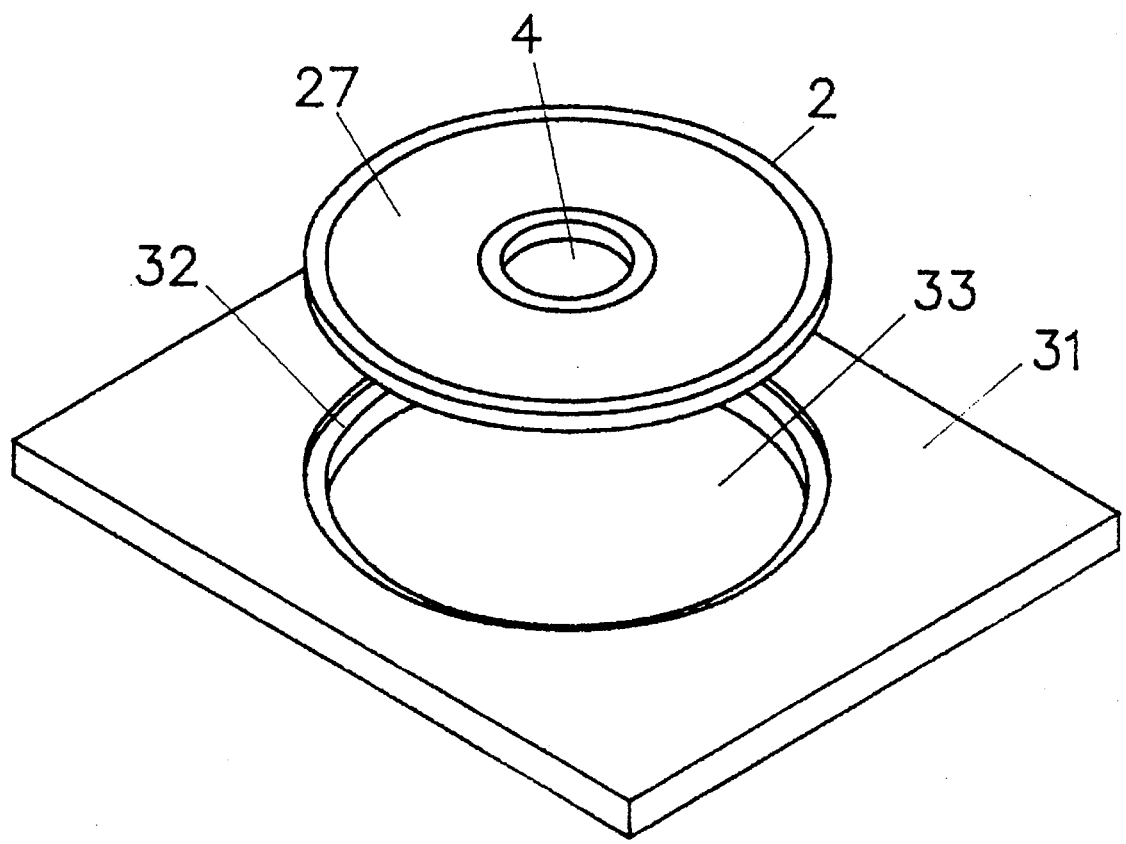
FIG. 4 is a perspective exploded view of a holder used to print on the surface of an optically transparent medium by use of an ink jet printer and an optical information medium.
Figure 5:
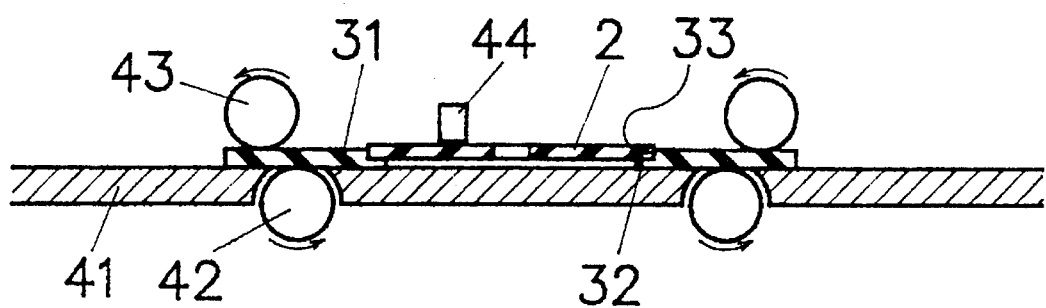
FIG. 5 is a schematic sectional view of an essential part of an ink jet printer used in an embodiment of the present invention.

FIG. 5 is a section view showing an essential part of a printing device for carrying out ink jet recording on the hydrophilic resin film 26 of the write-once optical information mediums set out hereinabove. FIG. 4 shows a holder 31 for holding the optical information medium 2 when ink jet recording is effected using the printing device.

The holder 31 has a rectangular form and is provided at the center thereof with a round hole 33 which has a diameter slightly larger than an outer diameter of the medium 2. The hole 33 has a stepped portion 32 along the entire inner periphery thereof in order to hold the outer edge of the medium 2. The stepped portion 3 has a depth which is slightly smaller than the thickness of the medium 2. As shown in FIG. 4, the optical information medium 2 is inserted into the hole 33 of the holder 21 such that the hydrophilic resin film 26 is turned upside and the outer peripheral portion at the incident side of reproduction light of the medium 2 is supported with the stepped portion 32. As a consequence, the medium 2 is supported with the holder 31 in such a way that the surface of the hydrophilic resin film 26 is slightly higher than the surface of the holder 31.

The medium 2 held with the holder 31 is mounted on a feed table 41 of the printing device shown in FIG. 5. Subsequently, rollers 42, 43 are moved to a position where the holder 31 is contacted therewith at the edge portion thereof. When printing signals such as from a computer are inputted to the printing device, the holder 31 starts to move by means of the rollers 42, 43. Where the optical information medium 2 is passed along the table 41 above which a printing head 44 is disposed, the printing head 44 serves to jet the particles of a printing ink on the surface of the hydrophilic resin film 26 of the medium 2 thereby printing desired letters or patterns on the surface of the film 26.

As having been set forth hereinabove, the printing device shown in FIG. 5 is an ink jet printer. As is well known in the art, the printing head 44 has a plurality of fine printing nozzles arranged thereon. The printing nozzles have, for example, an electrothermo converter which works according to electric signals, by which an ink in the nozzles is bubbled thereby jetting the ink from the tip of the individual nozzles. By this, the medium 2 passes along the feed table 31 and is deposited with the jetted ink at the position of the surface of the hydrophilic resin film 26.

The plate-shaped, optically transparent substrate 21 used in the medium 2 is generally made of resins whose refractive index relative to a laser beam ranges 1.4 to 1.6 and which has high transparency with good impact resistance. Specific examples of the resin include polycarbonates, polyolefins, acrylic resins and the like although not limited to these ones.

The substrate 21 is molded, for example, by injection molding using these resin materials. As shown in FIG. 2, the substrate 21 may be provided with a spiral guide groove 22 in the surface thereof although a tracking guide means in other forms may be used. Such a tracking guide means is usually formed by any known procedures using stampers.

The optical information medium is provided at least with a portion where information which is optically readable by means of a laser beam can be recorded or a recorded portion. The portion is intended to mean a layer from which information can be optically reproduced or recorded by irradiation with a laser beam, or a substrate surface or other surface which takes part in recording and reproduction. For instance, with the optical information medium of the write-once type shown in FIG. 2, the dye recording layer 23 and the reflective layer 24 formed on the substrate 21 in this order allow recording and reproduction of information. On the other hand, with a read-only optical information medium such as CD in which an optical reflective layer and a protective layer formed on the substrate, pit arrays formed on the transparent substrate 21 and the reflective layer covering the arrays take part in the reproduction of information.

The recording or reproduction system is optically arranged and is generally one which makes use of laser beams or an optomagnetic recording and reproducing system. Information is recorded or reproduced from one side of an optical information medium. In particular, a laser beam is passed from the surface side of the optically transparent substrate 21. Information is not optically recorded or reproduced from the other side.

When a laser beam is used for recording or reproducing light, the wavelength is generally in the range of 770 to 830 nm. Laser beams having a wavelength outside the above range may also be used.

Aside from the dye recording layer 23 and the reflective layer 24 shown in FIGS. 2 and 3, there may be formed other layers. For instance, a layer for modifying binding properties or a layer for improving reliability other than recording of information may also be formed. In FIG. 2, the dye recording layer is directly formed on the optically transparent substrate 21, but other layer may be intervened therebetween.

The protective layer is one which protects an information record portion against physical or mechanical damages as will be suffered to a side opposite to the transparent substrate 21, and is thus provided at a side opposite to the substrate 21. The protective layer 25 should preferably be made of an impact-resistant resin. The thickness of the protective layer is preferably in the range of from 5 to 10 microns and the layer may be made of a plurality of sub-layers which are, respectively, made of different types of materials.

The protective layer 25 is formed by applying a monomer and/or an oligomer of an organic compound capable of being polymerized into a polymer and subjecting it to a crosslinking reaction. Where an organic polymer is obtained by a crosslinking reaction, it is convenient in handling to use a procedure which comprises adding small amounts of a reaction initiator and a catalyst for the reaction to a mixture of a monomer and an oligomer of organic compounds which have one or more reactive acryloyl groups (—CH=CH2) in the molecule, adding a solvent such as methyl ethyl ketone or an alcohol to to the mixture to obtain a liquid mixture, applying the liquid mixture, and subjecting the applied mixture to irradiation of UV light or an electron beam for crosslinkage. Especially, it is preferred to use UV-curable resins because they can prevent an adverse influence on the substrate and the information layers upon formation of the protective layer 25 and can be formed within a short time.

The UV-curable resins may be any known UV-curable resins which are ordinarily used in optical information mediums. Examples include N-vinyl pyrrolidone, tripropylene glycol diacrylate, trimethylol propane triacrylate, hexanediol diacrylate and the like resins.

The manner of crosslinkage is not limited to those attained by UV irradiation. Crosslinkage by application of heat such as for epoxy resins and urethane resins may be used. Alternatively, it is possible to make use of a polymerization reaction which proceeds with the aid of moisture, such as for dialkoxysilane coupling agents.

The thus obtained crosslinked product may have the main or side chains which are made of saturated or unsaturated linear hydrocarbons, or may contain cyclic units such as of melamine, bisphenol or the like. Alternatively, the crosslinked product may be polyethers which have in the main chain or side chains one or more ether bonds, polyesters which have ester bonds, polyurethanes which have urethane bonds, ionomers containing ionic bonds, polyamides containing amido bonds, polyimides containing imido bonds, polysulfones containing sulfone bonds, polysulfides containing sulfido bonds, and other polymers containing other bonds. Of course, copolymers containing two or more bonds set out above, or block polymers may be used.

In order to improve the moisture proofing of the crosslinked products, fluorocarbons may be contained in the side chains. In order to prevent degradation with hydrogen chloride, epoxy resins may be used.

For improving the adhesion between the protective layer 25 and the hydrophilic resin film 26, it is preferred that the crosslinked products may contain in the side chains a hydroxyl group, a carboxy group, an acrylic group, an amino group, a vinyl acetate group and the like. Alternatively, basic acid residues may be contained in the main chain or side chains.

For the formation of the protective layer 25, solvents or diluents may be added, aside from a reactant and a reaction initiator, to the resin in the coating composition. In order to stabilize the coating film, additives such as levelling agents, plasticizers, antioxidants, antistatic agents and the like may be contained. If necessary, the layer may be colored by use of pigments or dyes.

The curing of the resin may be changed depending on the crosslinking density of a crosslinked structure or the reactive acryloyl concentration, and may also depend on the freedom of the revolutions of molecules of an oligomer which will constitute the main chain. When the rate of shrinkage at the time of curing the protective layer 25 is reduced, the protective layer is left as not strained after the curing. Thus, the layer is unlikely to break when subjected to a heat cycle test. Taking mechanical strength into consideration, the rate of shrinkage is preferably in ranges not larger than 12%, more preferably not larger than 10%.

The protective layer 25 may be formed by bonding a resin material to the reflective layer 24 without resorting to the coating technique. The materials may not be limited to organic compounds, but inorganic compounds may be used to form the layer by sputtering or vacuum deposition.

An oxidation-resistant layer for preventing oxidation of the optical reflective layer 24 may be provided between the reflective layer 24 and the protective layer 25.

In the practice of the invention, the optical information medium has a hydrophilic surface 27 so that the surface opposite to the reading laser beam incident side is fixed with a printing ink in desired patterns. The hydrophilic surface 27 is one which has sufficient hydrophilicity to fix an aqueous ink when the ink is dropped thereon and is not blotted on touch with a finger after 30 minutes. More particularly, the surface film allows the ink which is not deposited on the surface merely by drying of the ink but is fixable to an extent that the ink is not readily removed. The ink printed on the hydrophilic surface 27 is fixed on the surface 27 without reduction in the area of deposition.

As shown in FIG. 2, for example, the protective layer 25 is coated with a hydrophilic resin on the surface thereof to form a thin hydrophilic resin film 26, whose surface is called herein the hydrophilic surface 27. By this, a printing ink can be fixed. Examples of the hydrophilic resins include polyethylene oxide, polyvinyl alcohol, polyvinylmethyl ether, polyvinyl formal, carboxyvinyl polymers, hydroxyethyl cellulose, hydroxypropyl cellulose, methyl cellulose, sodium carboxymethyl cellulose, polyvinyl pyrrolidone, acryloyl morpholine and the like. At least one hydrophilic resin is provided, in which additives are formulated, if necessary, followed by coating.

While taking into account the weatherability, water proofing, reliability and productivity of the optical information medium, the resins are mixed as controlled in the formulation balance. The amount of the hydrophilic resin may be in the range of from 5 wt % to a solubility limit (e.g. 50 wt %), preferably from 5 to 20 wt %. If the amount is in excess, water proofing worsens with a tendency to degrade working properties during printing. In contrast thereto, when the amount is smaller, the wettability of ink becomes poor, with the possibility of giving rise to thin spots after printing.

Additives may be formulated in the hydrophilic materials. For instance, water-absorptive pigments, wetting agents, anti-foamers, surface tension controlling agents and the like may be added. Specific examples of the additives include inorganic pigments such as silica fine powder, fine powders such as of carboxymethyl cellulose, dextrin, methyl cellulose and the like, organic pigments such as polyvinyl pyrrolidone with a specific type coating for the purpose of being rendered insoluble in amide-based acrylates, acrylic acid/vinyl alcohol copolymers Sumika Gel SP-510, available from Sumitomo Chem. Co., Ltd.), and the like, anionic or nonionic known wetting agents (NOPCO 2272RSN (U.S. Registration No. 1670983), NOPCO WET 50 (U.S. Registration No. 937032), and NOPCO WET SN20T, all products available from San Nopco Limited), anti foamers (NOPCO 8034, available from San Nopco Limited, Dehydran 1620 (U.S. Registration No. 1407792) available from San Nopco Ltd.), surface tension controlling agents (Perenol s43 and s5, available from San Nopco Ltd.), thickeners such as polyethyleneimine (SP103, available from Nippon Catalysts Co., Ltd.), and the like.

The water-absorptive pigments used as an additive serve to control the printability of ink and working properties on formation of the hydrophilic film. The wetting agent contributes to improving the wettability and can control fluidity to obtain a mixture with a reduced degree of foaming. This permits the formation of the layer according to the step of forming other layers, such as a screening printing step, in the fabrication process of the optical information medium. Thus, the production efficiency can be improved. The anti-foamers and surface tension controlling agents contribute to the formation of a uniform film.

The addition of pigments to hydrophilic resins enables one to obtain a hydrophilic resin film 26 which is opaque or cloudy, or is colored. In doing so, an appropriate optical information medium may be selected depending on the type of ink color and the degree of printing, with its appearance being improved. If one makes use of the color of a layer provided beneath the protective layer, it is possible to make a relief engraved pattern by formation of a so-called offprint.

The hydrophilic resin film 26 should not preferably contain water, ethyl alcohol isopropyl alcohol, ethylene glycol, ethyl cellosolve, dimethylformamide and the like solvents. The solvent will attack the protective layer formed below and a UV-cured resin, leading to some possibility that reliability is lowered. If a solvent is used, the viscosity is varied on formation of the hydrophilic resin film such as by screen printing, presenting the inconvenience in the fabrication procedure.

The thickness of the hydrophilic resin film 26 should preferably be in the range of from 5 to 30 μm in order to prevent an adverse influence on recording and reproducing characteristics of the medium. Such a thickness is established by appropriately formulating the starting materials to control the viscosity.

It is preferred that the hydrophilic resin film 26 is formed on the protective layer 25 made of a UV-cured resin. Especially, immediately after the formation of the UV-cured resin film protective layer 25, i.e. during the time when the activity of the UV-curable resin serving as an underlaying layer is not lost prior to complete curing, the hydrophilic resin film 26 is formed. As a consequence, the layers are combined together at the boundary thereof, thereby improving the bonding properties.

The hydrophilic resin film 26 may be formed over the entire surface of the protective layer 25. As shown in FIG. 1, for example, the film 26 may be formed except the edge portions along the inner and outer peripheries of the protective layer 25.

The hydrophilic resin film should preferably be finely roughened on the surface thereof. When a printing ink is deposited on the surface 2 of the protective layer 25, the fine roughened surface permits an anchoring effect to be developed, wherein the deposited ink is retained and fixed in fine recesses of the surface. The roughened surface results in an increase in surface area of the hydrophilic resin film. 26, thereby promoting ink absorption.

The term "roughened surface" used herein is intended to mean a surface whose contact angle relative to an aqueous ink is smaller than that of a surface not roughened. When determined using a contact surface roughness tester, the roughened surface should preferably have an average roughness (Ra) of from 2.0 to 0.1 μm. The effect of the surface roughness on aqueous ink may, more or less, vary, depending on the physical properties of the film. In general, if the surface roughness is small, thin spots may be created when an ink is formed as solid although fine lines can be drawn with good resolving power. If the surface roughness is too great, both fine lines and solid patterns are liable to blot. Preferably, the average roughness (Ra) is in the range of from 1.0 to 0.5 μm. In this range, both fine line and solid prints obtained are good in practice.

The fine roughened surface of the hydrophilic resin film 26 can be formed by coating a hydrophilic resin on the surface of the protective layer by gravure coating. For instance, a resin mixed with a filler may be coated on the surface 2 of the protective layer 25 by screen printing, spin coating or the like coating procedure. When an organic or inorganic pigment is dispersed in the hydrophilic resin film 26, a roughened surface can be readily formed, with a great anchoring effect. The size of the pigment is appropriately in the range of from 1 to 10 μm, preferably from 3 to μm, within which good solid printability is attained.

Moreover, as shown in FIG. 3, when the hydrophilic resin film is subjected to plasma treatment to modify the surface thereof, the hydrophilicity of the surface 27 can be more enhanced. More particularly, an optical information medium is placed in an atmosphere of a dilute inert gas under highly reduced pressure conditions where a plasma is generated in the gas to treat the medium. By the treatment, the ink deposited on the thus treated surface becomes smaller in surface tension and also in the angle of contact of the ink, thus leading to an improvement in the wettability of the ink. The printing of an ink on the surface should preferably be effected as immediately as possible after the plasma treatment.

Inks applicable to the optical information medium of the invention are preferably aqueous inks although oily inks and UV-curable inks may be used.

As stated hereinbefore, where letters are printed on the hydrophilic surface 27, it is preferred to use ink jet printers although writing or screen printing may be used. As is well known in the art, ink jet printers are employed for personal computers and the like. Letters or patterns which are created in a computer may be repeatedly printed on the hydrophilic surface 27. In this sense, this type of medium is adapted for printing given letters or patterns on a relatively small number of mediums. Since it is possible to print without any mechanical impact such as tapping or without application such as of heat for fixing, the medium is not damaged. Further, there may be used a bubble jet system wherein a nozzle portion is heated by a heater to provide ink particles for printing.

The invention is more particularly described by way of examples.

There was provided a polycarbonate substrate which had been pressed by means of stampers to have a spiral tacking guide groove with a 0.8 μm in width, a 0.08 μm in depth and 1.6 μm in track pitch and which had an outer diameter of 120 mmφ, an inner diameter of 15 mmφ and a thickness of 1.2 mm within a diameter range of 46 to 117 mm.

0.65 g of 1,1-dibutyl-3,3,3,3-tetramethyl-4,5,4,5-dibenzoindodicarbocyanine perchlorate was dissolved in 10 ml of diacetone alcohol. The resultant solution was spin coated on the substrate while changing the number of revolutions so as to make an average thickness of 130 nm, followed by drying to form a dye recording layer. A 100 nm thick reflective layer was formed on the dye recording layer by sputtering of gold.

A UV-curable resin (SD-17, available from Dainippon Inks Mfg. Co., Ltd.) made of a main acrylic component was applied by spin coating, and irradiated and cured with UV light of 230 mj/cm$^2$ from a high pressure mercury lamp to form a 10 μm thick protective layer.

10 wt % of polyvinyl pyrrolidone and 5 wt % of polyvinyl butyral in an ethanol solvent were formulated and mixed for sufficient dissolution. Moreover, 5 wt % of a fine powder of synthetic amorphous silica with a size of about 4 μm was added to the resultant solution. The mixture was subjected to dispersion for 24 hours in a ball mill having a volume of 2 liters and using twelve balls, thereby obtaining a hydrophilic resin solution with a concentration of 40 wt %.

After the formation of the protective layer, the hydrophilic resin solution was applied onto the protective layer by screen printing, followed by drying at a temperature of 50° C. for 1 hour to form a 10 μm thick hydrophilic resin film. Thus, an optical information medium (Example 1) having the hydrophilic resin film was obtained.

The above procedure was repeated except that 10 wt% of polyvinyl alcohol and 10 wt % of hydroxypropyl cellulose was formulated in an ethanol solvent and mixed for sufficient dissolution, to which 5 wt % of fine powder of synthetic amorphous silica having a size of about 4 μm was further added, thereby obtaining an optical information medium having a hydrophilic resin film (Example 2).

The thus formed hydrophilic resin films had, respectively, a surface which was translucent and roughened. When the surface roughness (Ra) was subjected to measurement with a contact roughness tester (DEKTAK 3030, available from Veeco Instruments Inc.), it was in the range of 0.9 to 0.6 μm.

Given optical information was recorded in the respective optical information mediums by irradiating a semiconductor laser having a wavelength of 780 nm modulated with EFM signals along the guide groove at a power of 7.8 mW and at a linear velocity of 1.4 m/second.

Subsequently, the mediums were subjected to an accelerated deterioration test under conditions of a temperature of 70° C. and a humidity of 0% R.H. (dry) to check ink jet printability (IJP property) prior to and after the test. More particularly, the patterns "●" and "■" of the ink jet printer were printed to check solid printability as to whether these patterns could be printed without involving any half tone. In addition, a character having a number of strokes was printed to check a character printability as to whether the character could be printed while keeping clear spaces among stroke lines. The results are shown in Table 1 below.

TABLE 1

|  | Initial | After 100 hours |
|---|---|---|
| Example 1 | | |
| solid printability | good | good |
| character printability | good | good |
| Example 2 | | |
| solid printability | good | slightly blurred |
| character printability | good | good |

The optical information medium as obtained in Example 2 was provided. After formation of the hydrophilic resin film 26, the medium was subjected to plasma treatment using an argon gas under environmental conditions of 0.1 to 1 Torr., followed by determination of the IJP properties in the same manner as set forth above by use of an ink jet printer. Both properties were found to be good.

The angle of warpage of the individual mediums is shown in Table 2. Moreover, the angle of warpage of each medium which was allowed to stand under standard conditions of a temperature of 23° C. and a humidity of 50% R. H. for 98 hours is also shown in Table 2. The angle of warpage was determined according to the CD specification wherein there was measured an angle along the radial direction at a position corresponding to a radius of 55 mm from the center. The angle is shown as an average value of the measurements. For comparison, an optical information medium was made as having a 25 μm thick protective layer but without formation of any hydrophilic resin film. In all the case, the angle was not higher than 0.6° which is a value defined in the CD specification.

TABLE 2

| | Angle of Warpage (°) | | |
|---|---|---|---|
| | Initial | After 100 hours | Under Standard Conditions (98 hrs.) |
| Example 1 | 0.05 | 0.18 | 0.13 |
| Example 2 | 0.02 | 0.17 | 0.15 |
| Comparative Example | 0.02 | 0.17 | 0.15 |

The hydrophilic resin film of each medium was subjected to the ink jet printing test in the same manner as set forth hereinbefore and also subjected to an accelerated deterioration test under conditions of a temperature of 70° C. and a humidity of 85% R. H. for 8 hours, under conditions of a temperature of 70° C. for 8 hours, and under conditions of a humidity of 0% R. H. (dry) for 100 hours to check blurring and blotting of the prints. Slight degrees of blurting and blotting were observed. Three minutes after the printing on the surface of the hydrophilic resin film of each medium, the print surface was rubbed with a finger. However, no blurring defect was observed.

For comparison of the binding property between the protective layer and the hydrophilic resin film, a separation test (i.e. a cross cut tape test) was conducted. As a result, it was found that while a value of 97/100 was attained for the protective layer portion, a value of 100/100 was obtained for the hydrophilic resin film portion.

What is claimed is:

1. An optical information medium which optically readable information can be reproduced and/or recorded by a laser beam, said optical information medium comprising a plate-shaped, optically transparent substrate having a recording layer, a reflective layer, a proctective layer made of UV-curable resin and a hydrophilic resin film having a printing ink-fixable, hydrophilic surface provided at a side which is opposite to a side of said optically transparent substrate through which reproduction light is incident.

2. An optical information medium according to claim 1, characterized in that an aqueous ink is fixed on the hydrophilic surface to make an intended indication.

3. An optical information medium according to claim 1, characterized in that the resin forming the hydrophilic resin film is one or more resins selected from the group consisting of polyethylene oxide, polyvinyl alcohol, polyvinylmethyl ether, polyvinyl formal, carboxyvinyl polymers, hydroxylethyl cellulose, hydroxypropyl cellulose, methyl cellulose, sodium carboxymethtyl cellulose, polyvinyl pyrrolidine and acryloyl morpholine.

4. An optical information medium according to claim 1, characterized in that said hydrophilic surface is finely roughened.

5. An optical information medium according to claim 4, characterized in that the finely roughened surface is formed by dispersing an organic or inorganic pigment in the hydrophilic resin film.

6. An optical information medium according to claim 4, characterized in that the finely roughened surface is formed by surface treatment.

7. An optical information medium according to claim 1, characterized in that the protective layer is modified on a surface thereof to increase its hydrophilicity.

* * * * *

UNITED STATES PATENT AND TRADEMARK OFFICE
CERTIFICATE OF CORRECTION

PATENT NO. : 5 549 952
DATED : August 27, 1996
INVENTOR(S) : Yuji ARAI et al.

It is certified that error appears in the above-indentified patent and that said Letters Patent is hereby corrected as shown below:

Column 11, line 4; change "which" to ---in which---.
line 9; change "of UV" to ---of a UV---.
line 9; change "film having" to ---film formed thereon in that order, said hydrophilic resin film having---.
Column 12, line 3; change "carboxymethtyl" to ---carboxymethyl---.

Signed and Sealed this

Thirteenth Day of May, 1997

Attest:

BRUCE LEHMAN

Attesting Officer    Commissioner of Patents and Trademarks